United States Patent [19]

Hacker

[11] Patent Number: 4,507,838

[45] Date of Patent: Apr. 2, 1985

[54] TOOL FOR REMOVING AND REPLACING WHEELBEARINGS

[76] Inventor: Karl M. Hacker, 1921 Dover La., Castleton, N.Y. 12033

[21] Appl. No.: 366,865

[22] Filed: Apr. 9, 1982

[51] Int. Cl.³ .......... B23P 19/04

[52] U.S. Cl. .......... 29/263; 29/264; 29/266

[58] Field of Search .......... 29/256, 258, 259, 260, 29/261, 262, 263, 265

[56] References Cited

U.S. PATENT DOCUMENTS

| | | | |
|---|---|---|---|
| 1,550,285 | 8/1925 | Sherman | 29/261 X |
| 2,310,639 | 2/1943 | Johnson, Jr. | 29/262 |
| 2,373,064 | 4/1945 | Stelzer | 29/265 |
| 2,614,318 | 10/1952 | McCord | 29/263 |
| 3,611,540 | 10/1971 | Gibu | 29/263 |
| 3,893,216 | 7/1975 | Kushner | 29/258 X |
| 3,986,242 | 10/1976 | Kerr | 29/261 |
| 4,259,774 | 4/1981 | Dolinski et al. | 29/263 |

FOREIGN PATENT DOCUMENTS

| | | | |
|---|---|---|---|
| 23569 | 1/1931 | Australia | 29/262 |
| 840678 | 6/1952 | Fed. Rep. of Germany | 29/265 |
| 256622 | 2/1949 | Switzerland | 29/265 |

*Primary Examiner*—Frederick R. Schmidt
*Assistant Examiner*—Steven P. Schad
*Attorney, Agent, or Firm*—Heslin, Watts & Rothenberg

[57] ABSTRACT

A tool for removing and replacing automobile wheelbearings without removing either the axle or the bearing housing and without applying pressure to the axle. A frame is provided which is adapted to be secured to the bearing housing. An extractor is movably connected to the frame to travel between an advanced and retracted position. When the frame is secured to the bearing housing, the advanced position of the extractor places it in the bearing housing between the axle and the central opening of the bearing, with the end of the extractor being past the bearing. The end of the extractor is operable between an expanded and retracted state. In its expanded state, the end of the extractor cannot be moved through the central opening of the bearing and thus moving the extractor to its retracted position while it is expanded will draw the bearing out of the housing. To insert a new bearing, the extractor is moved to its collapsed state after which the bearing is mounted on the extractor such that the extractor passes through the central opening of the new bearing. As the extractor is moved to its advanced position the extractor shoulder, which is larger than the central opening, presses the bearing into the housing. If desired, a thrusting ring can be placed between the shoulder and the bearing to avoid any friction which might occur between them.

7 Claims, 7 Drawing Figures

TOOL FOR REMOVING AND REPLACING WHEELBEARINGS

FIELD OF THE INVENTION

This invention relates to automotive tools which are used for removing and replacing wheelbearings.

BACKGROUND AND SUMMARY OF THE INVENTION

Presently, in the automotive field, there are two basic ways in which wheelbearings can be rotatably connected to an automobile's axle. The first method will be called direct mounting since the inner annular portion of the bearing, commonly known as the inner race, is in direct contact with the axle. The second type of mounting can be called indirect mounting since the axle and the inner race are only in indirect contact with each other. In this second method, the bearing is inserted within a bearing housing and the axle passes through the central opening of the bearing but does not contact the inner race. Instead, a hub is secured to the bearing housing and the hub has a sleeve-like portion which fits between the axle and the inner race so as to bring them into indirect contact with each other.

Direct mounting has been much more common in the industry since it is this method that is generally used with rear-wheel drive automobiles. To remove and replace a directly mounted wheel bearing, it is first necessary to remove the axle and then utilize a bench press to push the wheelbearing off of the axle. With rear-wheel drive cars, this method has been found to be very acceptable since removing the axle is a relatively simple procedure.

More recently, however, there has been a sizeable increase in the number of front-wheel drive cars. The front-wheel drive cars, as well as some rear-wheel drive cars with independent suspension, have bearings which are indirectly mounted upon their axles. The removal of indirectly mounted wheelbearings has, until the present invention, been accomplished by using procedures similar to those used for replacing directly mounted wheelbearings. Thus, although front-wheel drive automobiles have been around for quite some time, the industry has carried over the old methods of replacing wheelbearings and has not recognized the possibility of using more efficient methods.

Without the use of the present invention, there are basically two ways to remove bearings which are indirectly mounted to the automobile's axle. In the first, the entire bearing housing is disconnected from the automobile and a bench press is used to remove the old bearing and replace it with a new one. After this procedure, the bearing housing is then reattached to the automobile. In the second, the automobile axle, instead of the bearing housing, is removed. Once the axle is removed, both ends of the housing are opened and the bearing can be pulled through the housing. While both of these procedures are effective, the removal of either the bearing housing or the axle is a very time-consuming procedure. For example, with a front-wheel drive Volkswagen, the shop manual estimates 1.9 hours as the time necessary to remove the bearing housing and change a single wheelbearing. Although the manual does not estimate the time it would take for one to remove the axle instead of the housing, it can be expected that the overall time could be decreased by approximately one-half hour.

In addition to the significant amount of time which both of these methods require, removing either the bearing housing or the axle also affects other portions of the automobile. Should one decide to remove the wheelbearing by first removing the bearing housing, it is generally necessary to do a realignment after the bearing has been replaced. This involves readjusting both the toe-in, which keeps the wheels parallel to each other, and the camber, which maintains the wheels substantially perpendicular to the roadway.

Should one choose instead to remove the front axle, there will generally be less readjusting. Nevertheless, other time-consuming tasks must be performed. For example, to remove the axle, one must first raise the entire front end of the automobile. In addition, a rubber boot, filled with grease, is on the inner end of the axle. The removal of the axle allows the grease which is packed in the rubber boot to leak out. This grease not only hampers the work by getting on the tools and auto parts, but when a significant amount has leaked out, the boot must be repacked prior to reinserting the axle.

Although I have always sought new ways to reduce the time it takes to perform automotive repairs, I did not actively begin working on a device for replacing wheelbearings until I started racing front-wheel drive automobiles. I was motivated to develop a more efficient wheelbearing tool when, during the preliminary runs of several races, I found that the bearings needed to be changed. With only an hour or so before race time, my only choices were either to be scratched from the race or run my automobile with the worn bearings.

It is, therefore, a main object of this invention to provide an automotive tool for removing and replacing wheelbearings faster than prior tools and methods.

It is an additional object of this invention to provide a tool for removing and replacing wheelbearings which eliminates the need to remove either the axle or the bearing housing.

An additional object of this invention is to provide a tool for removing and replacing wheelbearings which could be adapted to fit various cars.

An additional object is to provide a tool which will not mar a new wheelbearing while that wheelbearing is being moved into the bearing housing.

Another object of this invention is to provide a tool for replacing wheelbearings which, when used, would not strain sensitive parts of the automobile, such as the axle.

An additional object of this invention is to provide a tool which could be used for removing wheelbearings without the need to raise the entire front end of the automobile.

It will be understood that prior to removing and replacing a wheelbearing by either my invention or any of the prior art methods, a number of parts must first be removed. This is necessary in order to gain access to the bearing. Generally, this requires removal of the tire, disc brake caliper, brake rotor, axle nut, hub, and splash plate. In addition, there are two "C" clips each of which fits into a recess in the bearing housing. One of these clips is on the innermost side of the bearing and the other is on the outermost side. Together, these clips prevent the bearing from sliding within the housing. With my present invention, only the "C" clip on the outermost side of the bearing needs to be removed. As previously mentioned, if one is to use either of the prior art methods for removing the wheelbearings, it will also be necessary to remove either the axle or the bearing housing as well as the innermost "C" clip.

Briefly described, the present invention has a frame which can be securely attached to the bearing housing of an automobile. An extractor member is moveably connected to the frame so as to move between an advanced and retracted position. The extractor is shaped so that in its advanced position it extends into the bearing housing through the space between the central opening of the bearing and the axle. The end of the extractor is expandable, and thus, once the end of the extractor is inserted past the bearing, it can be expanded to a circumference which is greater than the central opening. The removal of the extractor will thereby draw the bearing out of the bearing housing. A thrusting ring is adapted to be mounted on the extractor so as to push a new wheelbearing into the housing as the extractor member is once again moved to its advanced position. During this procedure, the extractor is kept in its collapsed state so that it can be removed without engaging the new bearing.

Also briefly described, this invention can be fabricated with a base, and a plurality of finger-like extension which extend outwardly from the base. These extensions have an annular configuration and are biased toward a collapsed state. In this collapsed state, the fingers can be inserted through the space between the axle and the central opening of the bearing which is created when the hub and its inner sleeve are removed. Once a portion of the finger-like extensions is past the bearing, the extensions are expanded radially outwardly so that they cannot pass through the bearing without engaging it.

A method of using this invention can also be described wherein the frame is positioned so that an extractor, connected to the frame, can be inserted into the bearing housing. This insertion moves the extractor to its advanced position such that the extractor extends through the space between the central opening of the bearing and the axle such that the end portion of the extractor is past the bearing. The end portion of the extractor is then enlarged to an outer circumference which is greater than the central opening of the bearing. The extractor is then withdrawn from the housing which also withdraws the bearing. After the bearing is withdrawn, the outer circumference of the extractor is returned to its collapsed state and the old wheelbearing is removed. The new wheelbearing is then slid onto the extractor and pushed into the bearing housing.

Once one is familiar with the above described invention and its method of use, the removal and replacement of a wheelbearing can be completed within approximately 16 minutes when applied to an automobile such as a front-wheel drive Volkswagen Rabbit.

DETAILED DESCRIPTION

Figure 1:
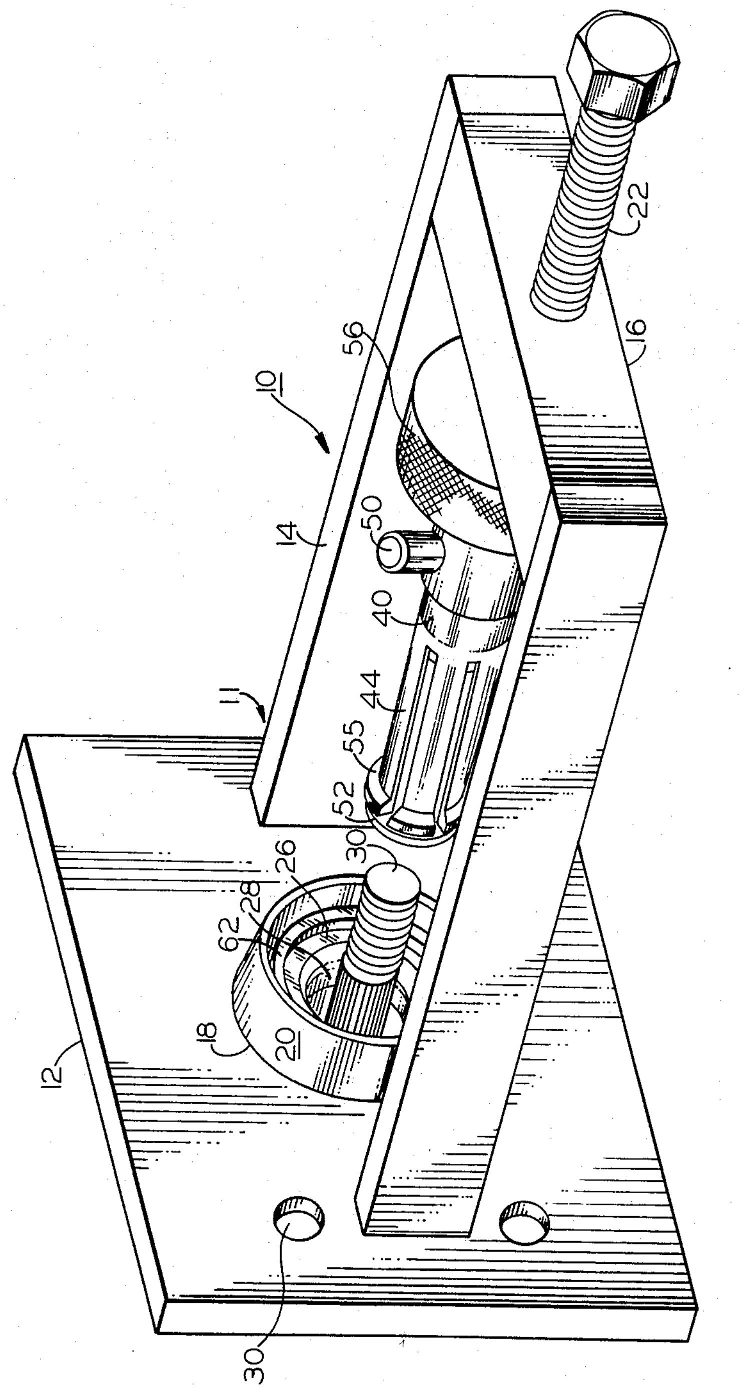
FIG. 1 is a rear perspective view of the invention.

FIG. 1 shows the tool, generally designated as 10, for removing and replacing wheelbearings. The frame 11 of the tool 10 consists of a housing contact plate 12 and a pair of support bars 14 which are connected at one end to the plate and extend outwardly therefrom, such that both support bars are substantially parallel to each other. The free end of the support bars are connected to each other by means of a crossbar 16. When the tool is secured to the automobile, an opening 18 in the housing contact plate 12 corresponds to the opening in the bearing housing 20 in which the bearing is secured.

Figure 2:
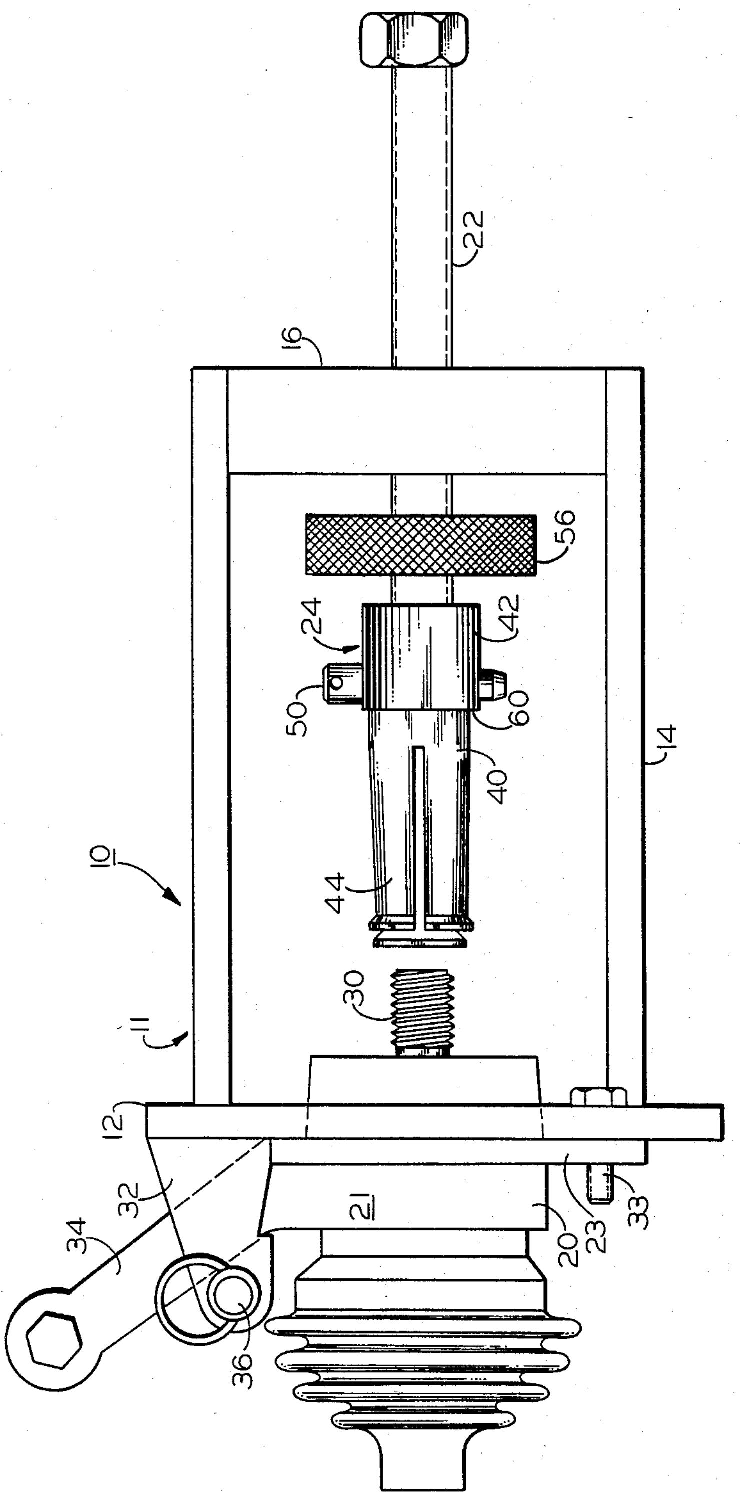
FIG. 2 is a top elevational view of the invention when operatively placed on an automobile.

For the purposes of this application, the bearing housing 20, as shown in FIG. 2, will be understood to include a main body 21 and a plate-like structure 23 which extends radially outwardly around the body 21.

A threaded rod 22 extends through the crossbar 16 and is secured to an extractor 24. When so attached, the extractor is positioned between the support bars 14. When the threaded rod 22 is screwed forwardly, the extractor 24 goes through the opening in the contact plate 12, and into the bearing housing 20, (See FIG. 3). The extractor then moves through the ring-shaped wheelbearing 26 between the central opening 28 of the bearing and the axle 30.

In order to secure the tool to the bearing housing, a pair of holes 31 are located in the contact plate. These holes correspond to threaded receptors in the plate-like structure 23 of the bearing housing 20. These threaded receptors are normally used to attach the disc brake caliper to the housing and are therefore available to secure the tool once the caliper has been removed. Thus, as shown in FIG. 2, the tool is attached on one side by bolts 33 and on the other side by a keeper 32. The keeper 32 is connected to the contact plate 12 and extends both above and below the steering arm 34. A removable stud 36 is inserted through the keeper so that the steering arm is locked between the contact plate 12 and the stud 36.

Figure 6:
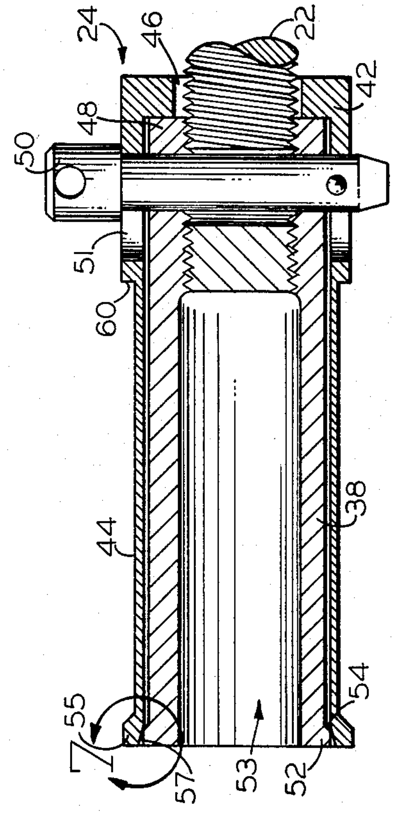
FIG. 6 is a cross-sectional view of the extractor member.
Figure 7:
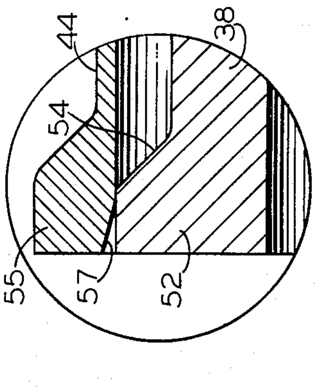
FIG. 7 is an enlargement of the expandable end portion of the extractor.

The extractor used for removing and replacing wheelbearings has an expandable end portion (See FIGS. 6 and 7). In my preferred embodiment, I have fabricated the extractor with an outer tube 40 which is slideably mounted upon an inner tube 38. The outer tube consists of a base 42 and a plurality of finger-like extensions 44, best seen in FIGS. 1 and 2, which extend outwardly from the base in an annular configuration. Threaded rod 22 extends through a base opening 46 in the outer tube 40 and is threaded into a second base portion 48 of the inner tube 38. A locking pin 50 extends through the outer and inner tubes and through the threaded rod 22. This locking pin 50 serves to maintain these parts in a secured relationship to each other while allowing for the removal of the extractor from the threaded rod when the pin is removed. In this way, various sized extractors can be used in order to compensate for any variation in the size of the central opening of the bearing to be removed.

Figure 4:
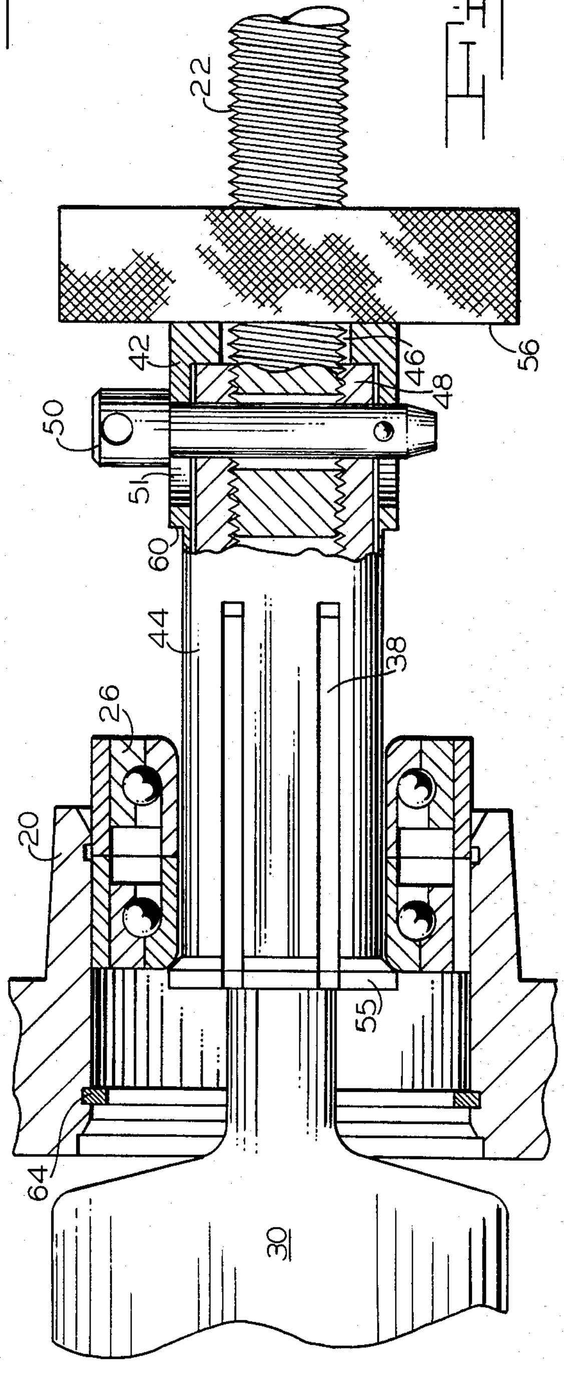
FIG. 4 is a side elevational view of the invention partly in cross-section showing the extractor member in its expanded state and in the process of removing the wheelbearing.

While locking pin 50 maintains the above parts in a secured relationship, it must not interfere with the sliding of the outer tube 40 over the inner tube 38. Therefore, as shown in FIGS. 4, 6 and 7, the locking pin 50 rides in a slot 51 in the outer tube 40 as the outer tube is moved between its forward and rearward positions.

In my preferred embodiment, the inner tube has a hollow center portion 53 which serves to receive the axle without putting any pressure on it (See FIG. 6). The end of the inner tube 38 which is opposite the second base portion 48 has a flange 52. Flange 52 has a gradual inclined surface 54 which extends from the outer surface of the inner tube to the top of the flange. Similarly, at the end of the finger-like extensions are enlarged portions 55 and each of the inner surfaces of these enlarged portions 55 has a beveled part 57 for coaction with inclined surface 54 (See FIG. 7).

When the outer tube is moved forward, the enlarged ends ride up on the flange 52, thereby urging the fingers radially outwardly to a predetermined circumference which is larger than the central opening of the bearing. Of course, when it is desirable not to engage the bearing, the extensions are moved off of flange 52 thereby returning them from their expanded to their collapsed state. In order to move the outer tube to its forward position which corresponds to the expanded state of the extractor, a lock nut 56 is rotatably mounted on the threaded rod between the extractor 24 and the cross-bar 16. When the lock nut 56 is rotated against the base of the outer tube, it pushes the outer tube forward until the base 42 contacts the second base portion 48 of the inner tube 38. I have found it preferable to fabricate the finger-like extensions from a springy material so that they are biased toward their collapsed positions. Because of this biasing, one need only to withdraw the lock nut in order to have the outer tube returned to its collapsed state.

It should be appreciated that other types of expandable extractors could be used to grip the bearing. Similarly, there could be a variety of other ways of expanding and contracting the extractor. For example, the inside tube could be drawn back to expand the extensions instead of urging the outer tube forward.

In order to insert a new bearing, I prefer to utilize a thrusting ring 58 which is slid around the extractor until it comes to rest against a shoulder 60. The new bearing is then slid over the extractor until it comes to rest against the thrusting ring 58. I have found that an old wheelbearing can serve as a very suitable thrusting ring. In such an arrangement, it is beneficial to shave the outer surface of the old bearing slightly so that it can move freely in and out of the bearing housing (See FIG. 5). One advantage of using an old bearing is that during the insertion, the rotation of the extractor rotates the inner race of the old bearing thereby preventing friction which could make the insertion more difficult. Of course, the old bearing simply presses against the new one thus prevening any maring. It should be noted that the extractor could be made so as to avoid the need to use the thrusting ring 68. For example, the shoulder 60 could be moved closer to the expandable end of the extractor such that the shoulder itself could push the new bearing into the bearing housing. In this latter situation, the shoulder 60 would cause the rotation of the inner race of the new bearing.

Figure 3:
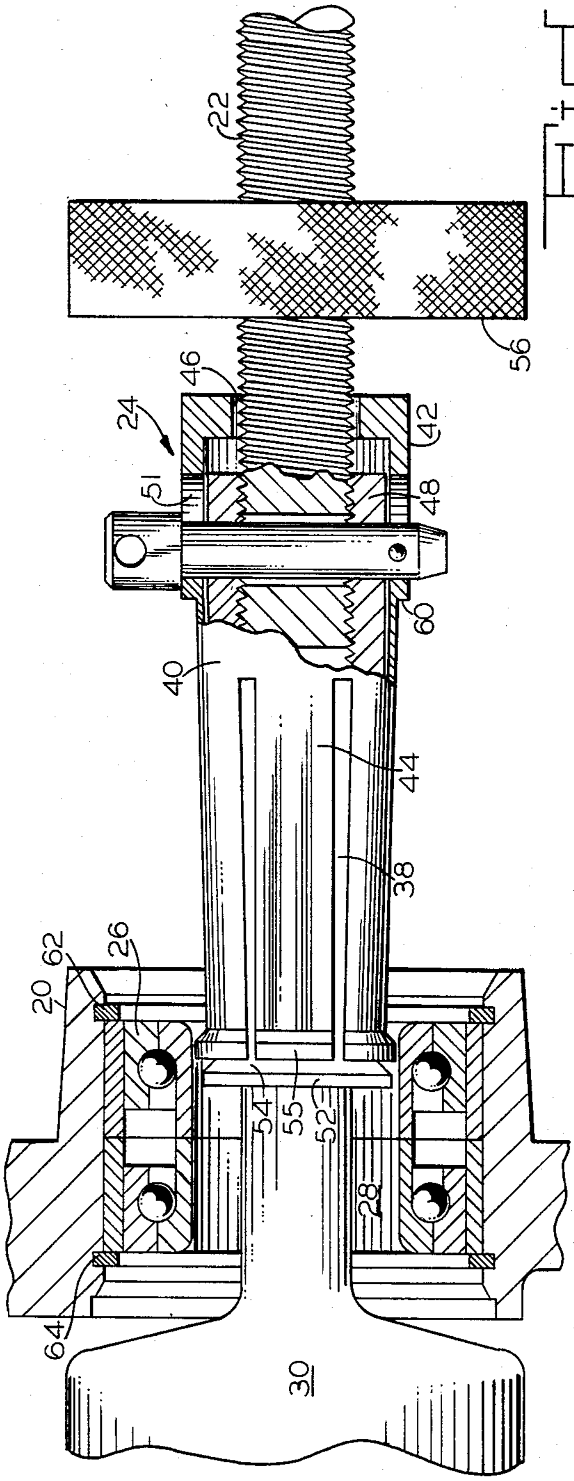
FIG. 3 is a side elevational view of a portion of the invention partly in cross-section being inserted through a bearing housing.
Figure 5:
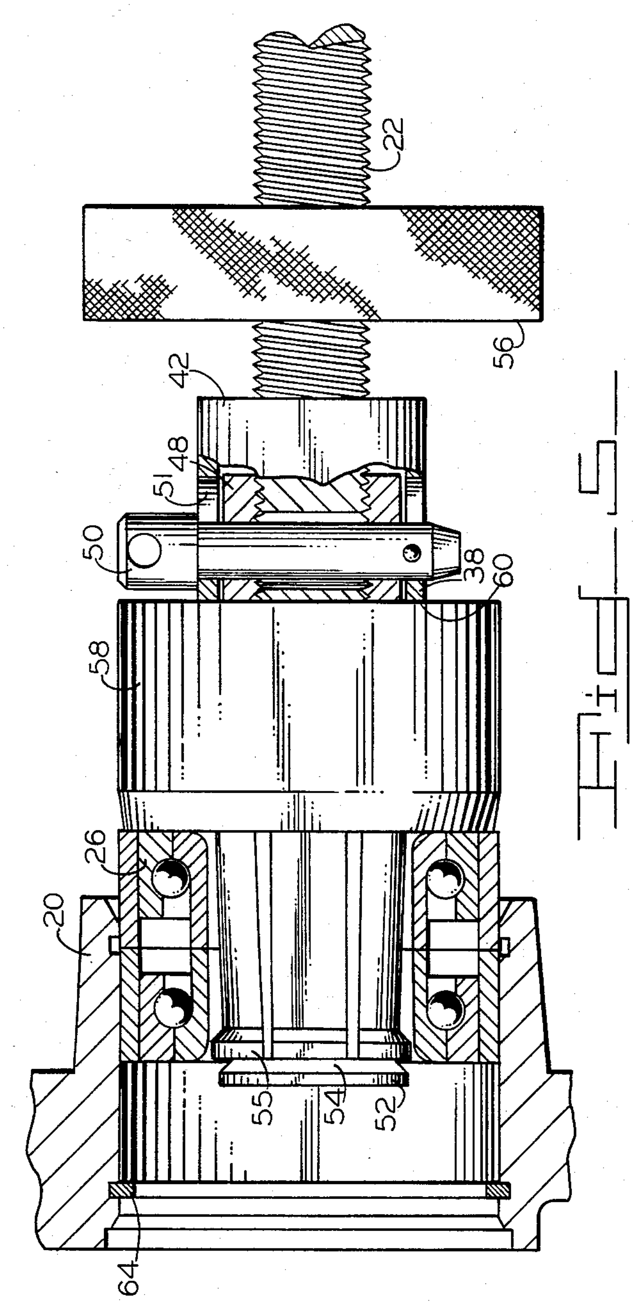
FIG. 5 is a side elevational view of a portion of the invention showing the insertion of a new bearing into the housing.

FIGS. 3–5 show the present invention as it is used. In operation, the present invention is attached to a bearing housing. As previously mentioned, this is done after the removal of the tire, brake caliper, brake rotor, axle nut, hub, splash plate, and outer most "C" clip 62. Since the hub acts as a sleeve which connects the inside of the bearing to the axle, the removal of the hub creates a space between said axle and the inner portion of the bearing. The tool is connected to the bearing housing by means of two bolts 33 on one side and on the other side a keeper 32 holds the steering arm 34. Once this is accomplished, the threaded rod 22 is rotated thereby moving the extractor toward its advanced position as shown in FIG. 3. After the end portion of the extractor has passed beyond the bearing, it will bottom-out against the axle 30. At this point, the lock nut 56 is rotated so as to press against the base 42 of the outer tube 40 and force it forward until it comes in contact with the second base portion 48 of the inner tube 38. By doing this, the enlarged portion of the finger-like extensions 44 are forced up and upon the flange 52, thereby creating an expanded state wherein the circumference is greater than the central opening of the bearing. The threaded rod 22 is then rotated to withdraw the extractor. Since the threaded rod and the extractor are rigidly secured to each other, the extractor also rotates, thereby turning the inner race of the bearing. Once the bearing is moved completely outside of the bearing housing, the lock nut 56 is rotated away from the base 42 and the finger-like extensions 44 will contract from their expanded position back to their collapsed state. The old bearing is then simply removed from the extractor.

In order to insert a new bearing, it is preferred to first slip a thrusting ring 58 around the extractor until it comes to rest on the shoulder 60. The new bearing is then put on the extractor in front of the thrusting ring 58 and the threaded rod is turned, once again moving the extractor to its advanced position. It can be determined that the new bearing is in its proper position since the bearing will come to rest against the inner most "C" clip 64. Once in place, the extractor is simply removed and the wheel is reassembled.

Clearly, various modifications and changes could be made on this invention without departing from the spirit thereof. Accordingly, it is intended that this invention be limited only to the appended claims.

What is claimed is:

1. A tool for removing or replacing a ring-shaped automotive-type wheelbearing from the bearing housing after removal of the hub, but without having to remove the axle or bearing housing and without applying pressure to the axle comprising:

an extractor member having an expandable end portion, and being operable between an advanced and a retracted position, said advanced position being such that the expandable end of the extractor member extends into the bearing housing past the bearing, said retracted position being such that the entire extractor member is without the bearing housing, said extractor member including a cylindrical outer tube having a base and a plurality of fingers, said fingers having enlarged ends extending in one direction from the base and arranged in a spaced apart relationship with one another in an annular configuration around a common axis, and said fingers being biased in a normally collapsed state in which they can be inserted through the space between the central opening of the bearing and the axle and withdrawn therefrom without engaging the bearing, and a cylindrical inner tube having a second base portion on one end and a flange located on the opposite end, said flange having an outer circumference which is larger than the circumference of the inner tube, wherein the inner tube is concentrically associated with the outer tube for spreading the fingers radially outwardly from their collapsed state to an expanded state so that they cannot pass through the bearing without engaging it and for returning their ends to their collapsed state, and the inner tube having a hollow portion adapted to receive the axle;

said extractor member including a means for thrusting a replacement wheelbearing into the bearing housing upon the movement of the extractor from its retracted to its advanced position; and a frame member which is adapted to be rigidly secured to the automobile in a positon outside the bearing housing such that the extractor member is movably connected thereto and can be inserted into the housing to engage the bearing, said frame adapted to exert an outward extracting force on the bearing as the extractor is withdrawn from the housing, while simultaneously exerting an inward force on the bearing housing.

2. The invention of claim 1 wherein the tool further comprises:

the extractor being connected to the frame by means of a threaded rod, so that rotation causes the extractor to move into and out of the bearing housing, the threaded rod also being connected to the second base portion, wherein the outer tube has an opening in its base so that the threaded rod passes freely through the base opening in a direction opposite to that in which the fingers extend; and a lock nut for urging the base of the outer tube toward the second base portion of the inner tube.

3. The invention of claim 2 wherein the outer tube is slidably mounted over the inner tube and is capable of relative longitudinal movement therewith between the collapsed state of the fingers where the flanged end of the inner tube and the enlarged ends of the fingers are out of alignment and the expanded state of the fingers where the flanged end of the inner tube and the ends of the fingers are in alignment and wherein the enlarged ends of the fingers grip the bearing when said ends are spread radially outward.

4. The invention of claim 3 wherein the movement of the outer tube from its collapsed to its expanded state causes the enlarged ends of the fingers to ride up upon the flange thereby combining to form a circumference which is greater than the individual circumferences of either the flange or the enlarged ends of the fingers.

5. The invention of claim 1 wherein a steering arm is connected to the bearing housing and the frame further comprises:

a housing contact plate which is adapted to be secured against the bearing housing, said contact plate having an opening therein which corresponds to the opening in the bearing housing in which the bearing is secured; and a keeper connected to the contact plate which is adapted to hook around the steering arm to support the frame member.

6. The invention of claim 1 wherein the thrusting means further comprises:

a thrusting ring adapted to be mounted on the extractor so as to push the replacement bearing into the bearing housing as the extractor moves from its retracted to its advanced position.

7. The invention of claim 3 further comprising a locking pin and a corresponding slot that extends through the outer and inner tubes and through the threaded rod, said pin is capable of maintaining these elements in a secured relationship while permitting the longitudinal movement of the outer tube over the inner tube.

* * * * *